219-121 CROSS REFERENCE SEARCH ROOM

HERMETICALLY SEALED ELECTRICAL DISCHARGE DEVICE

Filed July 15, 1954

INVENTORS
John P. Stelmak, David L. Moore & Walter O. Mansfield, Jr.
BY F. E. Browder
ATTORNEY 2,836,702

HERMETICALLY SEALED ELECTRICAL DISCHARGE DEVICE

John P. Stelmak, David L. Moore, and Walter O. Mansfield, Jr., Horseheads, N. Y., assignors to Westinghouse Electric Corporation, East Pittsburgh, Pa., a corporation of Pennsylvania Application July 15, 1954, Serial No. 443,614

7 Claims. (Cl. 219—85)

This invention relates generally to the construction of hermetically sealed containers and more particularly to envelopes for semiconductor devices and the sealing of such envelopes.

A semiconductor device includes a semiconductor crystal, such as germanium or silicon, with a suitable amount of impurity therein. The crystal is provided with a large-area electrode or low-resistance connection and with one or more small-area or rectifying connections. It has been found that the utilization of metallic components for enclosing a semiconductor device and hermetically sealed with the use of a soldering flux, is harmful to the operation of the device in that the solder flux vapors are injurious to the semiconductor crystal. The application of heat to melt the solder so as to form the hermetic seals in the metal type enclosures by induction furnace, soldering irons and other forms of radiant energy sources has also been injurious to the semiconductor devices. The heat produced by these methods has resulted in cracking the glass insulators surrounding the lead-in conductors and, also, in damaging the semiconductor crystal.

Accordingly, it is an object of this invention to provide an improved semiconductor device.

It is another object to facilitate the manufacture or assembly of electrical devices.

It is another object to improve the electrical characteristics of semiconductive devices.

It is another object to provide a simplification of construction of a semiconductive device so that its method of assembly is adaptable to mass production techniques.

It is another object to provide an inexpensive and hermetically sealed housing for electrical discharge devices.

It is another object to provide a method of providing localized heating for soldering two metal members together.

The foregoing objects and others which may appear from the following description are accomplished in accordance with one aspect of our invention by providing an enclosure or envelope which is comprised of three main parts. One part of the envelope is a tubular metal member while the second and third members are end plug seals. The end plug seals comprise a button of glass having a metallic rim sealed around the periphery. The peripheral surface of the plugs, which have a similar configuration to that of the inner surface of the housing, taper from dimensions smaller than the internal dimensions of the metallic tubular member to the other end having greater dimensions. The lead-in wires for connection and supports to elements within the envelope are sealed into the glass button and the electrode structure within the tube is supported primarily by extension of the lead-in wires within the interior of the envelope.

The envelope is assembled by press fitting the end seal plugs into the ends of the tubular member. The envelope may be then hermetically sealed around the mating surface between the end seal plugs and the tubular member.

These and other objects are effected by our invention as will be apparent from the following description taken in accordance with the accompanying drawings throughout which like reference characters indicate like parts, and in which.

Figure 1:
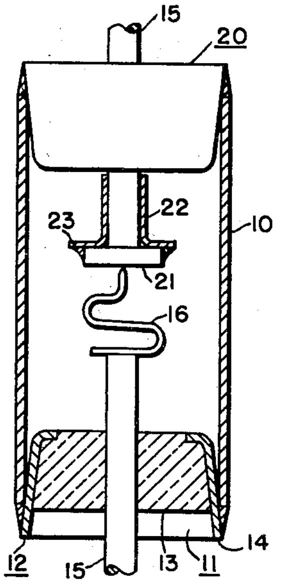
Figure 1 is an elevational view, partly in section, of a semiconductor type diode rectifier embodying the present invention.

Referring in detail to the drawings, a specific embodiment of our invention is shown in Fig. 1 incorporated in a semiconductive device of the type known as a diode or rectifier. The diode comprises a metallic housing 10, which is tubular in shape and of a suitable material, such as nickel or copper.

A point contact assembly or closure member 11 is press-fitted into one end of the housing 10 and hermetically sealed thereto. The point contact assembly 11 is comprised of a tapered cylindrical end seal plug 12 which consists of a disc or button 13 of insulating material, such as glass. The insulating disc 13 has a peripheral rim 14 of a suitable metal, such as Kovar, which is sealed to the insulating disc 13. A lead-in wire 15 is molded into the insulating disc 13 so as to be hermetically sealed thereto, and the interior portion of lead-in 15 is utilized to support an internal element point contact 16. The point contact 16 may be of any suitable design and material, such as phosphor bronze and is soldered or welded to the interior portion of the lead-in 15.

A crystal support assembly or closure member 20 is mounted or inserted into the other end of the housing 10 and is hermetically sealed thereto. The crystal support assembly 20 is of similar structure to that of the point contact assembly, with the exception that the interior element supported by the interior portion of the lead-in wire 15 is a crystal 21. The crystal disc or wafer 21 is of a semiconductive material, such as silicon or germanium, and is attached to the lead-in wire 15 of the crystal support by means of a tubular member 22 which fits over the lead-in wire 15, and having an extending flange portion 23 near the end of the lead-in wire 15. The crystal 21 is attached to the flange portion 23 of the tubular member 22 by suitable means such as soldering.

The three main parts or basic units of the semiconductive device are the metallic casing 10, the crystal support assembly 20 and the point contact assembly 11. The point contact assembly 11 and the crystal support assembly 20 are assembled prior to positioning them within the housing 10. The metal housing 10 and the rim 14 on the end seal plugs 12 are tin-plated or dipped in a suitable low temperature solder such as 60% tin and 40% lead prior to assembly.

After the point contact assembly 11 and crystal assembly 20 are assembled as individual units, they are driven into the opposite ends of the housing 10 until the point contact 16 bears against the crystal 21 with the desired amount of pressure. Due to the taper provided on both end seal plugs 12, the plugs 12 are press-fitted into the housing 10 so that a rigid aligned structure is obtained. The assembled structure may now be easily handled without danger of damage to the device, and the remaining step of hermetically sealing the structure is accomplished in a manner to be described later.

Figure 3:
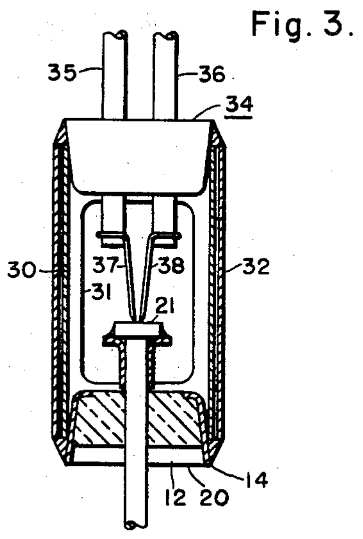
Fig. 3 is an elevational view, partly in section, of a transistor semiconductor type device embodying the present invention.

Referring in detail to Fig. 3, another modification of our invention is shown incorporated into a semiconductive device of the type known as a transistor. The transistor comprises an inner metallic tubular housing 30 having a window 31 provided therein and an outer metallic member or housing 32 of similar configuration as the inner member 30 but without an opening. The inner dimensions of the outer member 32 are slightly larger than the outer dimensions of the inner member 30 and are such that it may be telescoped or slipped over the inner member 30. The crystal mounting structure 20 has previously been described with reference to Fig. 1 and is press fitted into one end of the inner housing 30 and hermetically sealed to the outer housing 32.

A point contact assembly 34 is provided and is modified from the assembly 11 shown in Fig. 1 in that two point contact elements are provided. Two lead-in wires 35 and 36 are sealed into the insulating disc 13 of the end plug seal 12 and the interior portion of the lead-in wires 35 and 36 are each provided respectively with point contacts 37 and 38 which are supported thereon. The point contacts 37 and 38 may be of similar design and structure as the point contact 16 described in Fig. 1.

The point contact assembly 34 is press fitted into the opposite end of the inner housing 30 and hermetically sealed to the outer member 32.

The main parts of the transistor unit consists of an inner housing 30, an outer housing 32, a crystal support assembly 20 and the point contact assembly 34.

The metal housings 30 and 32 and the rims 14 of the end seal plugs 12 are dipped or tin-plated in a suitable solder. After the point contact assembly 34 and the crystal assembly 20 are assembled as individual units, they are driven into opposite ends of the inner housing 30 until the contacts 37 and 38 bear against the crystal 21 with the desired amount of pressure. The opening 31 provided in the inner housing 30 allows the spacing between the point contacts 37 and 38 on the surface of the crystal 21 to be adjusted. The correct spacing of these points 37 and 38 is important in the proper operation of a transistor. The outer sleeve or housing 32 is then placed over the inner sleeve 30 and is hermetically sealed to the end plug seals 12 in a manner to be described.

Figure 5:
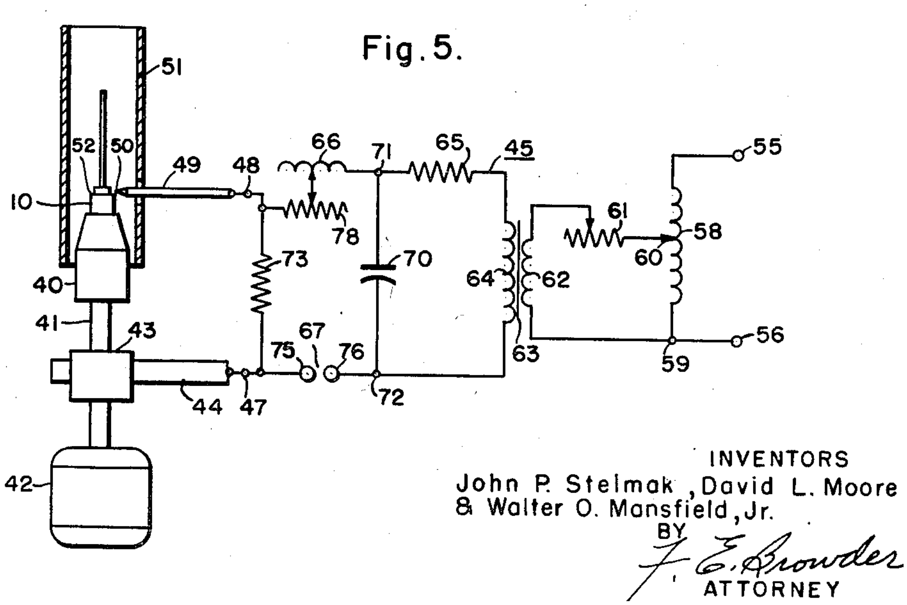
Fig. 5 is a schematic showing of the sealing device and associated voltage generating source.

The sealing machine utilized in hermetically sealing the above-described devices comprises a chuck member 40, the basic elements of which are shown for purposes of illustration in Fig. 5, into which the semi-conductive device is inserted so as to physically hold and electrically contact the housing 10 or 32 of the assembled device. The chuck member 40 is mounted to a shaft 41 which is driven by a suitable motor 42 so that the semiconductive device may be rotated about its longitudinal axis at a suitable speed. An electrical connection 43 is made to the shaft 41 by means of an electrode 44 from an output terminal 47 so that a suitable voltage from a voltage generating source 45 may be applied to the housing 10 or 32. The other output terminal 48 of the voltage source 45 is connected to a second electrode 49 which is tapered to a point 50, and this point 50 is positioned adjacent to the top edge of the housing 10 or 32. A tubular gas-delivery tube 51 is positioned so as to substantially surround the entire semiconductive device so that an inert gas, such as argon, may be directed onto the sealing area 52 during the soldering operation.

The voltage generating source 45 for the soldering operation consists of a suitable commercial alternating-current voltage of 120 or 220 volts—60 cycle applied to two input terminals 55 and 56. The two input terminals 55 and 56 are connected by means of the leads, respectively, to the upper and lower ends of an autotransformer 58. The output of the autotransformer 58 is obtained from a fixed terminal 59 on the lower end of the autotransformer winding 58 and a movable tap 60 positioned intermediate the upper and lower ends of autotransformer winding 58. The movable tap 60 on the autotransformer 58 is connected through a variable resistor 61 to the upper end of a primary winding 62 of a transformer 63, while the fixed tap 59 is connected to the opposite or lower end of the primary winding 62 of the transformer 63. The secondary winding 64 of the transformer 62 has its upper terminal connected through a series combination comprised of a resistance 65, a variable inductance 66, and a variable resistor 78 to the output terminal 48. The lower terminal of the secondary winding 64 is connected through an adjustable voltage control gap 67 to the other output terminal 47 of the voltage generating source 45. A capacitor 70 is connected between the common terminal 71 of the resistor 65 and inductor 66 and the common terminal 72 of the voltage control gap 67 and the lower terminal of the secondary winding 64. A resistor 73 is provided and is connected across the two output terminals 47 and 48 so as to be in shunt across the output terminals. The output terminal 47 is connected by means of the connector 44 to the semiconductor housing 10 or 32, while the other output terminal 48 is connected to the electrode 49.

In the operation of the voltage generating source 45, the suitable commercial voltage is connected to the two input terminals 55 and 56 of the autotransformer 58. The autotransformer 58 of suitable design having a rating of about 1 kva. to 2.5 kva. provides a means of adjusting the voltage supplied to the transformer 63. The voltage supplied to the primary winding 62 of the transformer 63 is adjustable by means of the movable output terminal 60 on the autotransformer 58. The variable resistor 61, which is provided between the movable terminal 60 of the autotransformer 58 and the primary winding 62 of the transformer 63, is provided for varying the current supplied to the primary winding 62 to the desired value. In one specific application of our invention, the voltage and current in the primary winding 62 are adjusted to the order of 105 volts rms. and 5 amperes. The transformer 63 is a voltage step-up transformer of the order of 10 to 1. The current induced in the secondary winding 64 of the transformer 63 charges the condenser 70 which may be of the order of .01 microfarads to a desired value. The leakage resistor 73, which is of the order of one megohm, permits the voltage built up on the condenser 70 to be applied across the voltage control gap 67. The voltage control gap 67 is comprised of two suitably shaped electrodes 75 and 76 of adjustable gap space of the order of .10 inch. The voltage on the condenser 70 rises due to the charging current until the voltage across the voltage control gap 67 is of a value such as to break the voltage gap down between the electrodes 75 and 76. The formative time lag can be reduced and stabilized by irradiating this gap 67 with ultraviolet—2537 mercury radiation, for example. The deionization of the gap 67 may be accomplished by a suitable air blast, such as 2 pounds per square inch against a minimum one-quarter inch orifice which is placed about 1 inch from the gap 67. When the voltage control gap device 67 breaks down, then there is sufficient voltage developed across the semiconductive device and the electrode 49 so that an oscillatory spark discharge follows therebetween. The oscillatory frequency of this spark discharge is determined substantially by the following expression:

$$F=\frac{1}{2\pi\sqrt{LC}}$$

where L is the inductance of inductor 66 and C is the capacitance of capacitor 70. The magnitude of the initial current surge through the discharge is substantially determined by the expression:

$$J_0=V\sqrt{\frac{C}{L}}$$

where V is the voltage across the condenser 70 at the time of discharge.

The duration of this oscillatory discharge which constitutes what may be referred to as an oscillatory spark discharge is of the order of 50 microseconds and at a frequency of the order of 315 kilocycles per second. The distance between the electrode 49 and the semiconductor device 10 is of the order of 25 mils and the rotation of the semiconductive device is of the order of 6 revolutions per minute. By varying the values of 61, 70 and 66, the oscillatory spark discharge may be generated at a rate from 60 to 2400 times per second. The value of the variable inductance 66 may be varied from the order of 10 to 500 microhenries depending on the thermal capacity of the units.

It is important to note that in the assembly procedure the pressing of the tapered end seal plug 12 into the housing 10 or 30 causes the cold flow of solder on the plug 12. As the members 12 and 10 or 32 are brought into intimate contact, the solder on the surface of the end seal plug is pushed up ahead of the edge of the housing 10 or 30 so that a small fillet of solder is built up on the edge of the housing 10 or 30. The solder used has a low shear strength and the housing 10 or 30 are of adequate tensile strength to provide necessary force for cold forming the solder when the members are pressed together.

Figure 2:
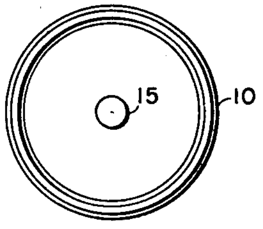
Fig. 2 is a top view of Fig. 1.
Figure 4:
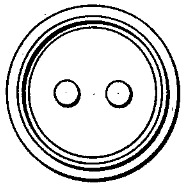
Fig. 4 is a top view of Fig. 3.

As the semiconductive device 10 rotates with the voltage generating source in operation, the solder on the rim 14 of the end seal plug 12, including the fillet built up on the edge of the housing 10 or 30, flows downwardly onto the edge of the housing 10 or 32 and 30 so as to substantially build up a solder fillet thereon as shown in the drawing, Fig. 2 and Fig. 4. In this manner, the housing 10 or 32 and 30 is hermetically sealed to the end plug seal 12. The solder surface in intimate contact will also melt and aid the seal.

It may be desirable in some applications to utilize a small solder ring which may be slipped over the end seal plugs 12 so as to rest on the top edge of the housing 10 or 32 so as to provide sufficient solder in sealing the structure.

Although we have described our invention specifically to hermetical sealing of semiconductive devices within a metal casing, our procedure also allows the use of filling mediums within the housing. For example, the housing 10 or 32 may be filled with a low boiling point liquid such as Freon for vapor cooling the semiconductive device elements, and due to the low temperature spark discharge soldering method utilized in the sealing operation, the cooling liquid will not be vaporized. It should also be pointed out that the low temperature spark discharge method set out heretofore eliminates the damage caused by seal blowout when utilizing a gas fill. The expansion of such a fill due to heat in the present methods utilized in soldering the hermetic seals does cause such blowouts.

While we have shown our invention in several forms, it will be obvious to those skilled in the art that it is not so limited but is susceptible of various other changes and modifications without departing from the spirit and scope thereof.

We claim as our invention:

1. In the method of making permanent vacuum type joints between metallic parts of electrical discharge devices, the steps comprising pre-tinning the surface of the parts to be placed in contact, pressing said surfaces together so as to form a rigid union, applying local heating of short duration near the zone of contact of said parts so that the solder flows around the zone of contact so as to make a permanent vacuum seal.

2. In the method of making permanent vacuum type joints between metallic parts of electrical discharge devices, the steps comprising pre-tinning the surface of the parts to be placed in contact, pressing said surfaces together so as to form a rigid union, applying local heating of short duration near the zone of contact of said parts so that the solder flows around the zone of contact so as to make a permanent vacuum seal, said local heating comprising a spark discharge.

3. In the method of making permanent vacuum type joints between metallic parts of electrical discharge devices, the steps comprising pre-tinning the surface of the parts to be placed in contact, pressing said surfaces together so as to form a rigid union, applying local heating of short duration near the zone of contact of said parts so that the solder flows around the zone of contact so as to make a permanent vacuum seal, said local heating comprising oscillatory spark discharges of about 300 kilocycles frequency and about 50 microseconds time duration.

4. In the method of assembling a hermetically sealed discharge device, the device comprising a metallic tubular housing and insert closure members, each of said closure members comprising a body of insulating material having a peripheral metallic rim sealed thereon, and at least one conductor passing through said body and hermetically sealed therein for supporting inner electrical members, a portion of the rim member being of slightly larger diameter than the interior diameter of said housing, the steps comprising tinning said rim and housing, forcing said closure members into each end of said housing to provide press-fit engagement and positioning of said electrical members in desired position with respect to each other and then joining the rim of said enclosure members to said housing for hermetically sealing said housing.

5. In the method of assembling a hermetically sealed discharge device, the device comprising a metallic tubular housing and insert closure members, each of said closure members comprising a body of insulating material having a peripheral metallic rim sealed thereon, and at least one conductor passing through said body and hermetically sealed therein for supporting inner electrical members, a portion of the rim member being of slightly larger diameter than the interior diameter of said housing, the steps comprising tinning said rim and housing, forcing said closure members into each end of said housing to provide press-fit engagement and positioning of said electrical members in desired position with respect to each other and then joining the rim of said enclosure members to said housing by heating with high frequency electrical discharge maintained between said housing and a counter electrode for hermetically sealing said housing.

6. In the method of assembling a hermetically sealed discharge device, the device comprising a metallic tubular housing and insert closure members, each of said closure members comprising a body of insulating material having a peripheral metallic rim sealed thereon, and at least one conductor passing through said body and hermetically sealed therein for supporting inner electrical members, a portion of the rim member being of slightly larger diameter than the interior diameter of said housing, the steps comprising tinning said rim and housing, forcing said closure members into each end of said housing to provide press-fit engagement and positioning of said electrical members in desired position with respect to each other and then joining the rim of said enclosure members to said housing by heating with high frequency electrical discharge maintained between said housing and a counter electrode for hermetically sealing said housing, said discharge being localized so that a solder seal is formed progressively around the periphery and adjacent to the edge of the housing as the electrical discharge device is rotated so that the overall temperature rise of the housing is negligible.

7. In the method of making permanent vacuum type joints between metallic parts of electrical discharge devices, the steps comprising pre-tinning the surface of the parts to be placed in contact, pressing said surfaces together so as to form a rigid union and cold flowing the solder so as to form a fillet near said union, applying local heating of short duration near the zone of contact of said parts so that the solder flows around the zone of contact so as to make a permanent vacuum seal.

References Cited in the file of this patent

UNITED STATES PATENTS

| | | |
|---|---|---|
| 1,238,257 | Butler | Aug. 28, 1917 |
| 1,504,088 | Bransten | Aug. 5, 1924 |
| 1,652,164 | Cayer | Dec. 13, 1927 |
| 2,174,218 | Greene | Sept. 26, 1939 |
| 2,308,860 | Clark | Jan. 19, 1943 |
| 2,431,368 | Cherry et al. | Nov. 25, 1947 |
| 2,503,429 | Ziegler | Apr. 11, 1950 |